United States Patent [19]

Kanameda et al.

[11] Patent Number: 4,951,916

[45] Date of Patent: Aug. 28, 1990

[54] PRESSURE-BALANCED ELECTROMAGNETIC VALVE

[75] Inventors: Yasumasa Kanameda; Takeo Kushida, both of Saitama, Japan

[73] Assignee: Diesel KIKI Co., Ltd., Tokyo, Japan

[21] Appl. No.: 439,268

[22] Filed: Nov. 20, 1989

[30] Foreign Application Priority Data

Nov. 21, 1988 [JP] Japan .................................. 63-292441

[51] Int. Cl.$^5$ ............................................. F16K 31/06
[52] U.S. Cl. ............................. 251/129.1; 251/129.16; 251/129.18; 335/246
[58] Field of Search ........... 251/129.16, 129.1, 129.18; 335/246

[56] References Cited

U.S. PATENT DOCUMENTS

| | | | |
|---|---|---|---|
| 4,673,163 | 6/1987 | Kushida et al. | 251/129.1 |
| 4,677,327 | 6/1987 | Kishida et al. | 251/129.16 X |
| 4,678,160 | 7/1989 | Yamada et al. | 251/129.1 X |

Primary Examiner—Arnold Rosenthal
Attorney, Agent, or Firm—Henry C. Nields

[57] ABSTRACT

Herein disclosed a disc type electromagnetic valve which is disposed in the passage of a fluid represented by pressurized gases or air for controlling the flow of the fluid. In a casing at the back of a stator, there is formed a chamber in which a diaphragm is arranged. This diaphragm has its radially inner side connected to either a movable receiver of a spring for biasing an armature apart from the attracting surface of the stator or the armature. The chamber at the back of the diaphragm is caused to communicate with a communication passage of the pressurized fluid through a passage hole which extends through the armature and a valve member. When the pressure of the fluid exerted upon the valve member fluctuates, the diaphragm is moved to automatically adjust the seating force of the valve member against a valve seat.

15 Claims, 4 Drawing Sheets

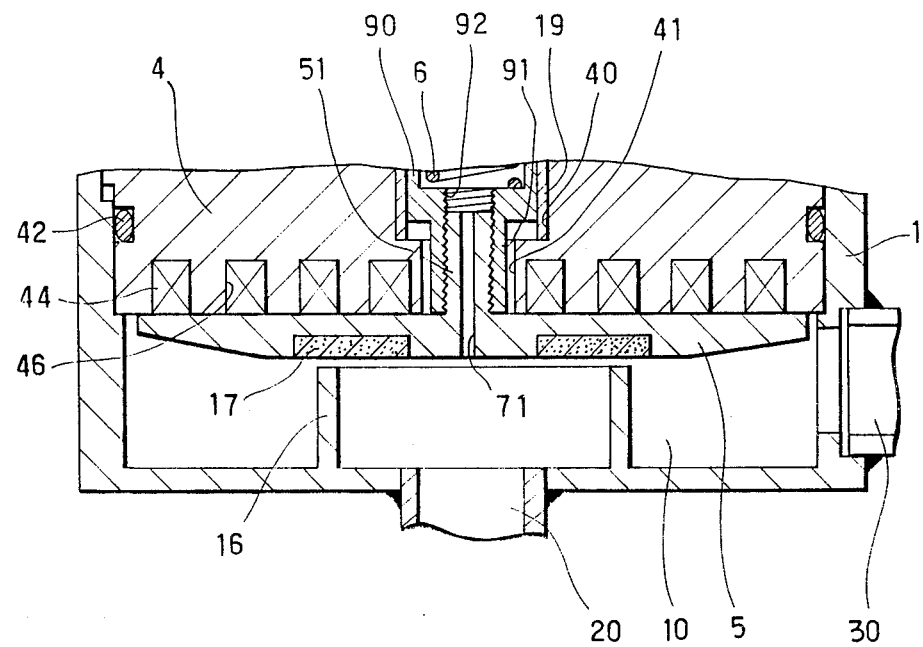
Fig.1-A

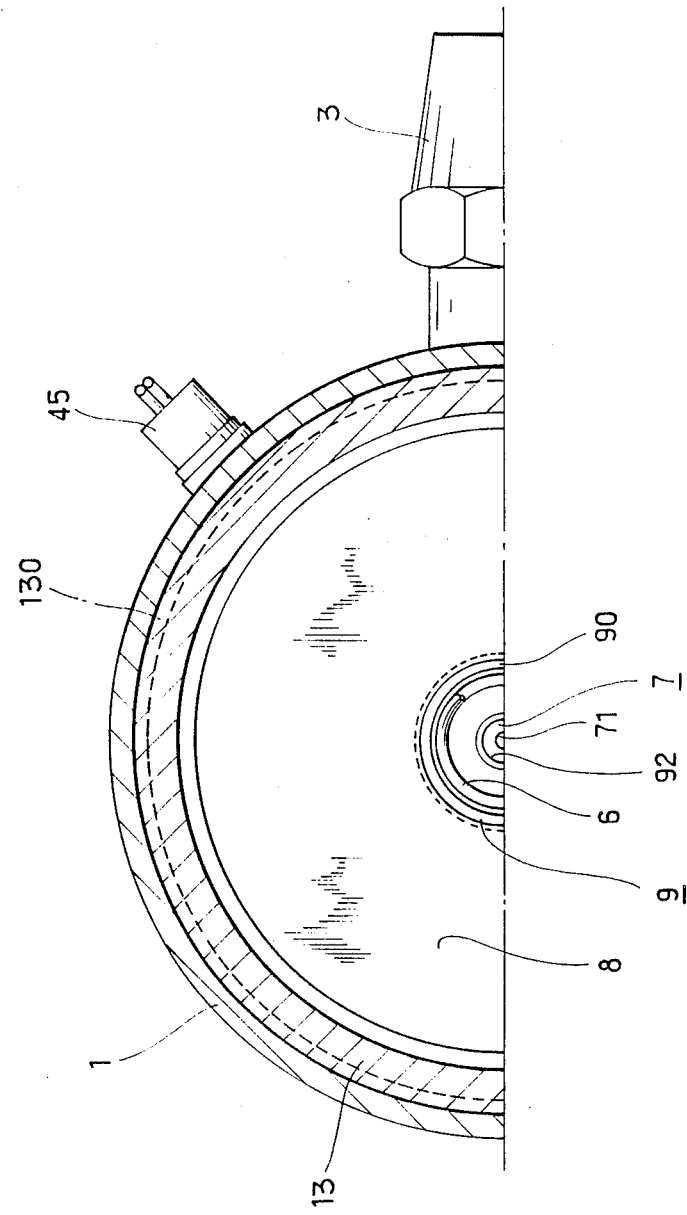

PRESSURE-BALANCED ELECTROMAGNETIC VALVE

BACKGROUND OF THE INVENTION

1. Field of the Invention

The present invention relates to an electromagnetic valve and, more particularly, to a pressure-balanced electromagnetic valve suited for controlling the flow of pressurized gases.

2. Description of the Prior Art

The technology of using a disc-type electromagnetic valve as means for controlling the supply of a liquid such as a liquid fuel is well known in the art, as is disclosed in U.S. Pat. Nos. 4,643,222, 4,673,163, 4,677,327, 4,678,000, 4,765,302 and so on. In these prior arts, a plate-shaped stator and an armature are arranged to face each other in a housing, and there is fixed at the center of the armature a valve rod which extends through the housing to an outside valve body as far as it faces a fluid inlet/outlet passage formed in the valve body. When coils arranged in the stator are energized, the stator is magnetized to attract the armature so that the valve rod may be moved in the direction to open or close the valve.

Another disc type electromagnetic valve is known in Japanese Patent Laid-Open No. 120017/1978. This prior art is different from the foregoing one in that the liquid inlet/outlet and the passage are formed in one casing. Specifically, a confined block is fixed in the opening of the casing accommodating a stator, and a passage chamber is formed between the block and the stator and equipped with fluid inlet and outlet which are out of shift from each other by 90 degrees. Moreover, an armature is arranged as a valve member in the passage chamber and is attracted by energizing a coils, which are arranged in the stator, so that it is moved apart from the surface of the confined block to provide the communication between the inlet and the outlet.

In either of the prior arts, the coils are provided in plurality such that they are mounted in a plurality of endless grooves formed in the stator and such that their adjacent ones are energized in opposite directions. As a result, magnetic fluxes of different directions are generated between the stator and the armature so that the armature can be actuated at a high speed.

In either of the prior arts, moreover, the armature is urged apart from the coil-arranged surface of the stator by the action of the spring which is interposed between itself and the housing (or casing). In the normal closed electromagnetic valve, more specifically, the spring is used as an element for blocking the passage when the stator is deenergized. In the normal open type, on the other hand, the spring is used as an element for opening the passage.

From the aforementioned characteristics, however, the electromagnetic valve of this kind frequently has its power supply circuit built the electronic control system and subjected to a duty ratio control. It is, therefore, desirable for the electromagnetic valve to have a stable operation and a quick responsiveness. For this desire, it is appropriate that the force of the aforementioned spring be set at a weak level. In case the fluid is an incompressible one such as oil, there arises no serious problem. In the case of high compressible gases represented natural gases or compressed air, on the contrary, the pressure is liable to fluctuate due to their characteristics to cause pulsations. As a result, the spring is compressed by the pulsations of the fluid flowing from the inlet to the passage in case the armature is pressed by a weak force. This causes the normal closed type to allow the armature to leave the valve seat accidentally thereby to open the passage and the normal open type to close the passage. In order to avoid such unstable operations, the practical answers to the problems are nothing but to set the spring force at a high level by predicting the pressure fluctuations of the fluid. However, the strengthening of the spring is to increase excess loads. As a result, the armature has to be attracted against the strengthened spring force so that the sensitivity of opening or closing the valve never fails to be deteriorated.

SUMMARY OF THE INVENTION

The present invention has been conceived to solve the aforementioned problems. An object of the present invention is to provide a disc-type electromagnetic valve which is suited for controlling the flow of a highly compressive fluid such as pressurized gases or air. More specifically, the object is to provide a pressure-balanced electromagnetic valve which can have its valve member pushed to a stationary valve seat by the fluctuating pressure, if any, of the fluid to be controlled, thereby to have excellent stability and responsiveness in the valve motions.

Another object of the present invention is to provide a disc type electromagnetic valve which is enabled, in the normal closed type, to weaken the set force of the spring for urging the armature and, in the normal open type, to weaken the electromagnetic force for moving the armature thereby to require no excess loads anticipating the safety factor.

Still another object of the present invention is to provide a disc type electromagnetic valve of this type, which can achieve the aforementioned objects even with a relatively simple structure.

In order to achieve the above-specified objects, the present invention adopts the following special structure in a valve which comprises: a casing having fluid inlet and outlet; a stator fixed in the casing to form a communication passage between said inlet and outlet and arranged with a plurality of coils in its surface; a valve member adapted to be brought into and out of contact with an annular valve seat disposed around the inlet in said communication passage; a plate-shaped armature made integral with or separate of said valve member and facing said stator; and a spring for biasing said armature away from the coil-arranged surface of said stator.

Specifically, a confined chamber is formed in the casing at the back of said stator. In this chamber, there is disposed a diaphragm which has its radially outer side fixed to the casing or stator side and its radially inner side connected to a spring force receiving portion to divide the chamber into upper and lower two compartments. The communication between the back of said diaphragm and said communication passage is always provided by a passage hole which extends through said valve member and said armature. These are fundamental characteristics.

The present invention can be applied to the disc type electromagnetic valves of both the normal closed and open types.

In the normal closed type, the stator has its coils facing the communication passage, and the opposed armature is made integral with (to act as) the valve member. The armature is connected directly or through a connecting member to a bottomed cylindrical movable spring receiver supporting one end of the spring. The diaphragm has its radially inner side fixed to the open edge of the movable spring receiver. In case the connecting member is used, the passage hole is formed in the axial direction to extend into the movable spring receiver.

In the normal open type, on the other hand, the stator has its coil-arranged surface facing the chamber, in which the armature is also positioned whereas the valve member is positioned in the communication passage. The armature and the valve member are connected by a shaft extending through the stator. The spring is arranged to enclose the shaft to have its one and other ends supported by the stator and the lower surface of the armature, respectively. Moreover, the valve member and the shaft are formed with the passage hole which extends in the axial direction to communicate with the communication passage and the back of the diaphragm.

In the case of the normal closed type, the force of the spring is transmitted, when the coils are deenergized, to the armature acting as the valve member so that the armature is brought into contact with the annular valve seat to block the communication passage. In the case of the normal open type, on the other hand, the armature is lifted, when the coils are deenergized, by the force of the spring so that the valve member opens the communication passage. When energized, the armature is attracted so that the valve member comes into contact with the annular valve seat to block the passage.

In either case, the pressurized fluid at the inlet side flows to the chamber through the passage hole extending through the stator. In case the pressure of the pressurized fluid is increased with the passage being blocked so that the valve member is pushed in the direction to open the valve, the increased pressure pushes the back of the diaphragm. In other words, the diaphragm is exposed to the pressure which has the same level as but in the opposite direction to the external force to be exerted upon the valve member. As a result, the pressure is automatically balanced so that the set spring force is accurately applied to the valve member.

The other features and advantages of the present invention will become apparent from the following detailed description to be made with reference to the accompanying drawings. However, the present invention should not be limited to the embodiments thereof so long as it has the fundamental features.

BRIEF DESCRIPTION OF THE DRAWINGS

FIG. 1A is a section showing a portion of another embodiment of the structure for connecting the armature and the movable spring receiver;

FIG. 2 is a half section taken along line I—I of FIG. 1; and

DETAILED DESCRIPTION OF THE INVENTION

The present invention will be described in the following in connection with the embodiments thereof with reference to the accompanying drawings.

Figure 1:
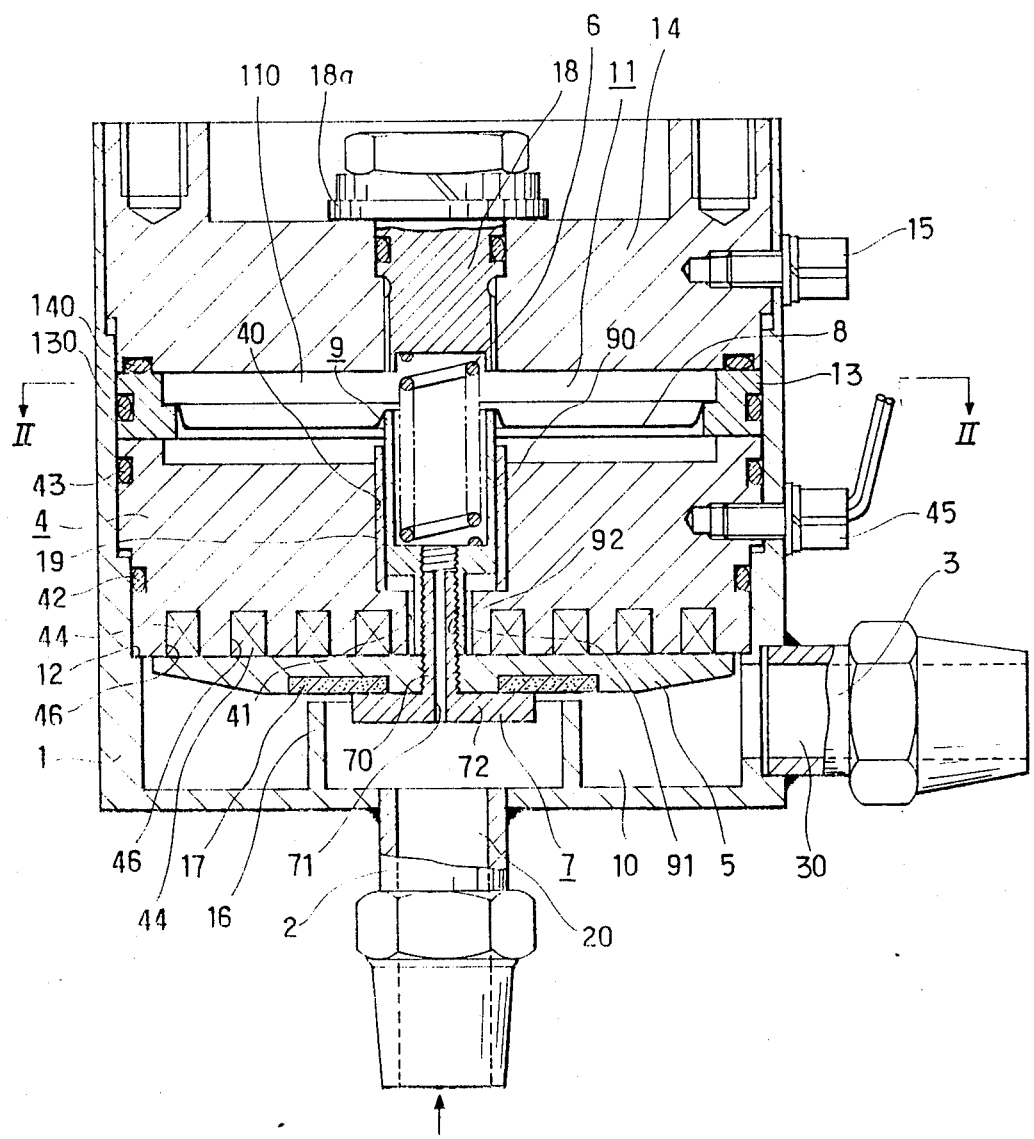
FIG. 1 is a longitudinal section showing an embodiment in which the present invention is applied to the normal closed type electromagnetic valve.

Of FIGS. 1 and 2 showing an (first) embodiment in which the present invention is applied to the disc type electromagnetic valve of the normal closed type, FIG. 1 shows the state in which the valve is open with the coils being energized.

Reference numeral 1 designates a cylindrical casing which is made of a non-magnetic material. A cylindrical inlet member 2 is fixed to one side of the casing 1, and a cylindrical outlet member 3 is fixed to the dislocated other side of the casing 1, thus forming an inlet 20 and an outlet 30.

Designated at numeral 4 is a stator which is made of a magnetic material and which has its lower surface formed with a plurality of concentric grooves 46. In these grooves 46, there are mounted coils 44 which are so arranged that their adjacent ones are energized in the opposite directions by a power supply terminal 45 attached to the side of the casing 1.

The aforementioned stator 4 is fitted as deep as a shoulder 12 formed in the inner wall of the casing 1 and is sealed gas-tight by O-rings 42 nd 43 on its outer circumference.

At the back of the stator 4, there is arranged an end block 14 through a ring member 13 made of a nonmagnetic material. The end block 14 is firmly fixed by means of a plurality of fixing bolts 15 which are driven into the end block 14 through the side wall of the casing 1.

The ring member 13 is fitted gas-tight in the inner wall of the casing 1 by means of an O-ring 130 on its outer circumference. As a result, a confined chamber 11 is formed among the back of the stator 4, the inner face of the ring member 13 and the lower surface of the end block 14.

Between the lower surface of the aforementioned stator 4 and the inner wall of the casing 1, there is formed a communication passage which takes the form of a chamber leading to the inlet 20 and the outlet 30. This communication passage 10 is formed an annular valve seat 16 which projects to enclose the inlet 20.

Designated at numeral 5 is a plate-shaped armature which is made of a magnetic material and interposed between the aforementioned annular valve seat 16 and the lower surface of the stator 4. In this embodiment, the armature 5 acts as a valve member, and its surface facing the annular valve seat 16 fixes therein a seat member 17 which is made of an elastic material such as hard rubber.

Designated at numeral 6 is a coil spring for biasing the aforementioned armature 5 away from the lower (coil-arranged) surface o the stator 4. This coil spring 6 has its one end supported by a stopper (or stationary spring receiver) 18 driven into the end block 14 and its other end borne by a movable spring receiver 9 which is made slidable with respect to the stator 4. The stopper 18 can be axially moved by replacing an adjusting shim 18a so that the coil spring 6 can have its set force adjusted.

In this embodiment, the movable spring receiver 9 is constructed of a bottomed cylindrical body 90 and a step 91 extending downward from the bottom of the body 90. The stator 4 is formed at its center with a hole 40 in which a bearing 19 is fitted. The receiver body 90 is slidably fitted in the hole 40 through the bearing 19, and the receiver stem 91 is loosely fitted in a hole 41 which is formed concentrically with the hole 40 in the lower surface of the stator 4. The bottom of the aforementioned receiver body 90 and the receiver stem 91 are internally threaded, as indicated at 92.

Designated at numeral 7 is a bolt-shaped connecting member which has its head 72 contacting with the lower surface of the armature 5 and its externally threaded stem 70 driven through the thickness of the armature 5 into the aforementioned internally threaded hole 92. As a result, the armature 5 and the movable spring receiver 9 are jointed together. Moreover, the connecting member 7 is formed through its head 72 and stem 70 with an axial passage hole 71, which extends through the internally threaded hole 92 into the spring receiver body 90.

Designated at numeral 8 is a diaphragm which is arranged in the chamber 11 at the back of the aforementioned stator 4. Thanks to the valve structure of disc type and large diameter, the diaphragm 8 can be arranged within a small space, and the absence of the sliding portions invites no leakage of the pressurized fluid and facilitates the manufacture. The diaphragm 8 may be suitably made of a metallic or non-metallic material having a large rigidity and a small elongation, as represented by a thin stainless steel sheet. The diaphragm 8 is sufficient to have a thickness of 0.1 to 0.2 mm if it is made of stainless steel.

This diaphragm 8 is formed into a disc shape having a hole at its center and has its radially inner side fixed to the open edge of the body of the aforementioned movable spring receiver 9 and its radially outer side fixed to the step of the ring member 13. For this fixing, the welding operation (including the adhesion) is preferable for retention of gas-tightness to the fastening operation using screws or the like. With this structure, the chamber 11 is divided across the diaphragm 8 into upper and lower compartments. Of these, the compartment 110 at the back of the diaphragm 8 is always allowed to communicate with the inside of the annular valve seat 16 through the inside of the receiver body 90, the internally threaded hole 92 and the passage hole 17.

Incidentally, the armature 5 and the movable spring receiver 9 are connected in this embodiment by the connecting member 7. However, this connecting member 7 is no indispensable but may be eliminated to effect the direct connection. This modification is shown in FIG. 1-A such that the armature 5 is formed at its upper surface center with a stem 51 which is driven through its external thread into the stem 91 of the movable spring receiver 9.

Figure 3:
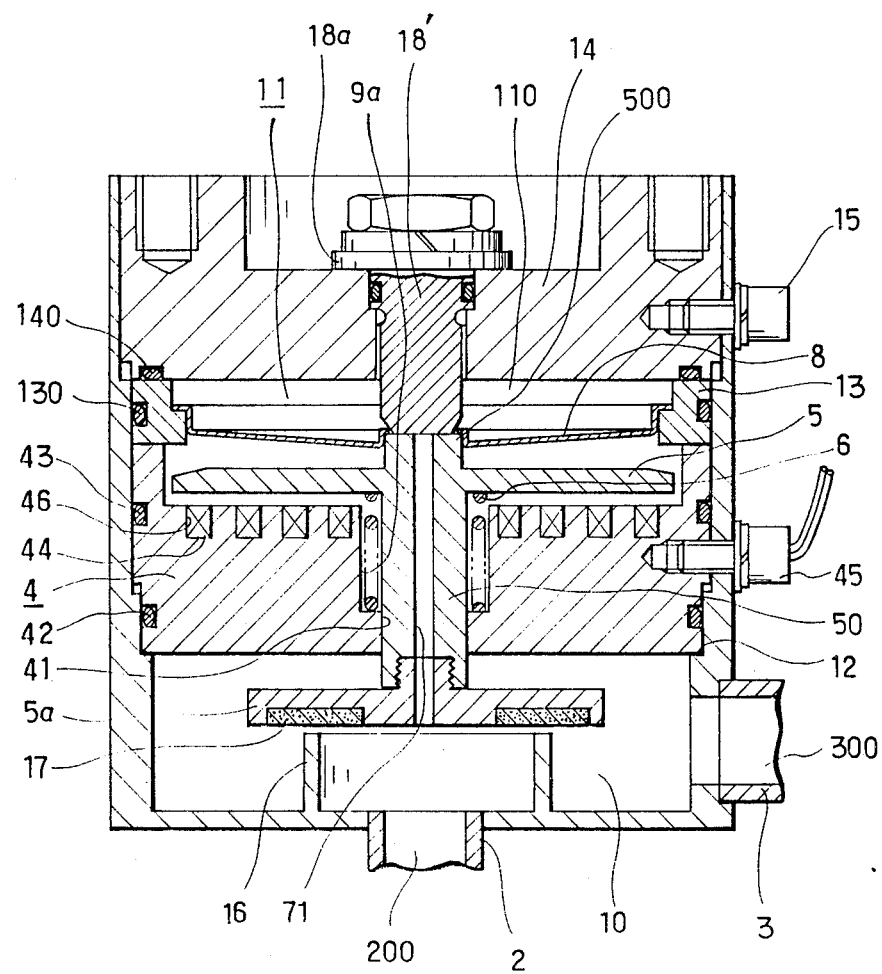
FIG. 3 is a longitudinal section showing another embodiment in which the present invention is applied to the normal open type electromagnetic valve.

FIG. 3 shows a (second) embodiment in which the present invention is applied to the disc type electromagnetic valve of the normal open type. In this embodiment, the armature 5 is made separate of a valve member 5a, which is arranged in the communication passage 10, and is positioned in the confined chamber 11 between the stator 4 and the end block 14 at the back. The armature 5 is attracted by the magnetic force when the coils 44 mounted in the upper surface of the stator 4 are energized.

The armature 5 is equipped with a shaft 50 which is made slidable in the hole 41 formed through the thickness of the stator 4. The valve member 5a is jointed to the lower portion of the shaft 50 by the driving or other suitable means. The seat member 17 facing the annular valve seat 16 is fixed to the valve member 5a like the aforementioned embodiment.

On the other hand, the stator 4 is formed with a spring receiver 9a which is as deep as required from the upper surface of the stator 4 and concentric with the hole 41. In the spring receiver 9a, there is arranged the coil spring 6 for biasing the armature 5 upward, i.e., in the valve opening direction.

Moreover, the passage hole 71 is formed through the valve member 5a and the shaft 50. In the confined chamber 11, there is arranged the diaphragm 8 which has its radially inner and outer sides welded or adhered to a shift leading end 500 extending from the upper surface of the armature 5 and the ring member 13, respectively.

The leading end 500 of the shaft 50 is positioned to abut against a stopper 18' which is driven into the end block 14. This stopper 18' can have its projection adjusted by the adjusting shim 18a.

The remaining structural components including the material of the aforementioned diaphragm 8 are identical to those of the first embodiment. Therefore, the same portions as those of the first embodiment are designated at the common reference numerals, and their descriptions will be omitted.

OPERATION

In the first embodiment, FIG. 1 shows the state in which the coils 44 are energized. At this time, the armature 5 is attracted to the lower surface of the stator against the force of the coil spring 6 by the magnetic force generated. Since the valve portion or the lower surface of the armature 5 then leaves the end face of the annular valve seat 16, the pressurized fluid of low viscosity such as the compressed air or gas coming from the inlet member 2 is allowed to flow from the inlet 20 through the annular valve seat 16 and the communication passage 10 until it flows out to the outlet 30. On the other hand, a portion of the pressurized fluid flows through the passage hole 71 and the internally threaded hole 92 into the body 90 until it flows into the back compartment 110 of the diaphragm 8.

If the power supply to the coils 44 is interrupted from that state, the movable spring receiver 9 is moved down along the bearing 19 in the hole 40 by the force of the coil spring 6, and this movement is transmitted to the armature 5 so that the armature 5 is moved downward to bring its seat member 17 into close contact with the end face of the annular valve seat 16. As a result, the communication between the inlet member 2 and the outlet member 3 is blocked to stop the flow of the pressurized fluid.

If, in this state, the pressurized fluid supplied from the inlet member 2 has its pressure fluctuated by the pulsations to exert an external pressure to the armature 5 or the seat member 17, then the external pressure is introduced from the passage hole 71 through the movable spring receiver 9 into the back compartment 110 of the diaphragm 8.

As a result, the diaphragm 8 is exposed to the pressure which is equal to the external force exerted upon the armature 5 and the seat member 17 but is opposed to the external force. Since the diaphragm 8 is made integral with the movable spring receiver 9, it pushes the armature 5 to the annular valve seat 16 through the movable spring receiver 9 by the force balanced with the external pressure. If the pressure of the pressurized fluid becomes weak, the force to be received by the movable spring receiver 9 is accordingly weakened. Therefore, even if the force of the coil spring 6 is set at a weak level, the armature 5 can always be held in the stable valve closing state.

In the second embodiment, with the coils 44 being deenergized, the armature 5 is raised away from the upper surface of the stator 4 by the force of the coil spring 6, as shown in FIG. 3, so that the valve member 5a is apart from the end face of the annular valve seat 16 to leave the communication passage 10 open. If the coils 44 are energized from this state, the armature 5 is attracted to the upper surface of the stator 4 against the force of the coil spring 6 so that the valve member 5a is moved downward to bring the seat member 17 into close contact with the end face of the annular valve seat 16 thereby to block the passage.

When, in this state, pressure fluctuations are caused in the pressurized fluid coming from the inlet member 2 to exert an external pressure to the valve member 5a, this external pressure is introduced from the passage hole 71 of the shaft 50 into the back compartment 110 to push the diaphragm 8 so that the armature 5 connected to the diaphragm 8 is pushed by the pressure which is equal but opposite to the external pressure. As a result, the seating pressure of the valve member 5a against the annular valve seat 16 is intensified so that the valve member 5a can be held in a satisfactory and stable closed state even if the electromagnetic force is weakened.

What is claimed is:

1. In a disc type electromagnetic valve disposed in the passage of a fluid represented by pressurized gases or air for controlling the flow of the fluid,
a pressure-balanced electromagnetic valve comprising:
 a casing 1 having fluid inlet 20 and outlet 30 and equipped therein with an annular valve seat 16 around said inlet 20;
 a stator 4 fixed in said casing to form a communication passage 10 between said inlet 20 and outlet 30 and made of a magnetic material arranged in its surface with a plurality of coils 44, the adjacent ones of which have inverse directions of power supply;
 a valve member 5a adapted to be brought into and out of contact with said annular valve seat 16 in said communication passage 10;
 a plate-shaped armature 5 made integral with or separate of said valve member 5a and facing said stator 4;
 a spring 6 for biasing said armature 5 apart from the coil-arranged surface of said stator 4;
 a confined chamber 11 formed in said casing 1 at the back of said stator 4;
 a diaphragm 8 arranged in said chamber 11 and having its radially inner side connected to a spring force receiving portion; and
 a passage hole 71 extending through said valve member 5a and said armature 5 for providing the communication between the back of said diaphragm 8 and said communication passage 10 around said annular valve seat 16.

2. A pressure-balanced electromagnetic valve according to claim 1, wherein said casing 1 is formed into a cylindrical shape, wherein said stator 4 is backed and fixed through a ring member 13 by an end block 14 to define said chamber 11 with said end block 14, said ring member 13 and said stator 4, and wherein said diaphragm 8 has its outer circumference fixed by said ring member 13 to divide said chamber 11 into upper and lower compartments.

3. A pressure-balanced electromagnetic valve according to claim 1, wherein said diaphragm 8 is made of a material having a rigidity and a small elongation, as represented by a stainless steel sheet.

4. A pressure-balanced electromagnetic valve according to claim 1, wherein said valve is of the normal closed type.

5. A pressure-balanced electromagnetic valve according to any of the preceding claims 1 to 4, wherein the coil-arranged surface of said stator 4 faces said communication passage, wherein said armature facing said stator acts as said valve member 5a, wherein there is fitted in said stator 4 a bottomed cylindrical movable spring receiver 9 which has its bottom connected to said armature 5 and its open edge fixing said diaphragm 8, and wherein said spring 6 is fitted in said movable spring receiver 9 and has its upper end supported by a stopper 18 mounted in said end block 14.

6. A pressure-balanced electromagnetic valve according to claim 5, wherein said movable spring receiver 9 is slidably fitted through a bearing 19 in a hole 40 formed at the center of said stator 4.

7. A pressure-balanced electromagnetic valve according to claim 6, wherein said movable spring receiver 9 has at its bottom side an internally threaded journal 91, into which a bolt-shaped connecting member 7 is driven to connect said armature integrally, and wherein said passage hole 71 extends from the head 72 through the threaded stem 70 of said connecting member 7.

8. A pressure-balanced electromagnetic valve according to claim 5, wherein said armature 5 has at its upper center a stem 51 connected directly to the journal 91 of said movable spring receiver 9.

9. A pressure-balanced electromagnetic valve according to claim 1, wherein said electromagnetic valve is of normal open type.

10. A pressure-balanced electromagnetic valve according to claim 9, wherein the coil arranged surface of said stator 4 faces said chamber 11, wherein said armature 5 is positioned in said chamber 11 whereas said valve member 5a is positioned in said communication passage 10, wherein said armature 5 and said valve member 5a are connected by a shaft 50 extending through said stator 4, wherein said spring 6 is arranged to enclose said shaft 50 and has its one end supported by said stator 4 and its other end supported by the lower surface of said armature 5, and wherein said passage hole 71 extends in the axial direction to provide the communication between said communication passage 10 and the back of said diaphragm 8.

11. A pressure-balanced electromagnetic valve according to claim 10, wherein said shaft 50 is made integral with said armature 5 and has its lower portion fixing said valve member 5a.

12. A pressure-balanced electromagnetic valve according to claim 10, wherein said shaft 50 projects from the upper surface of said armature 5 to have its stem end positioned by a stopper 18 mounted in said end block 14.

13. A pressure-balanced electromagnetic valve according to any of the preceding claims 1 to 4, wherein said armature 5 or said valve member 5a bears a seat member 17 of an elastic material in its surface facing said annular valve seat 16.

14. In a disc type electromagnetic valve disposed in the passage of a fluid represented by pressurized gases or air for controlling the flow of the fluid, a pressure-balanced electromagnetic valve comprising:

a casing 1 having fluid inlet 20 and outlet 30 and equipped therein with an annular valve seat 16 around said inlet 20;

a stator 4 fixed in said casing to form a communication passage 10 between said inlet 20 and outlet 30 and made of a magnetic material arranged in its surface with a plurality of coils 44, the adjacent ones of which have inverse directions of power supply;

a plate-shaped armature 5 forming a valve member having its lower surface to be brought into and out of contact with said annular valve seat 16 in said communication passage 10;

an end block 14 fitted and fixed at the back of said stator 4 through a ring-shaped member 13;

a bottomed cylindrical movable spring receiver 9 fitted slidably in a hole 40, which is formed to extend from the upper surface to the lower surface of said stator 4, and opened into a chamber 11 below said end block 14;

a diaphragm 8 having its radially inner side welded to the open edge of said movable spring receiver 9 and its radially outer side welded to said ring-shaped member 13;

a spring 6 fitted in said movable spring receiver 9 and its upper end supported by a stopper 18 which is mounted axially movably in said end block 14; and a bold-shaped connecting member 7 connecting the bottom side of said movable spring receiver 9 and said armature 5 integrally and having a communication hole for providing the communication between the inside of said movable spring receiver and said communication passage 10.

15. In a disc type electromagnetic valve disposed in the passage of a fluid represented by pressurized gases or air for controlling the flow of the fluid, a pressure-balanced electromagnetic valve comprising:

a casing 1 having fluid inlet 20 and outlet 30 and equipped therein with an annular valve seat 16 around said inlet 20;

a stator 4 fixed in said casing to form a communication passage 10 between said inlet 20 and outlet 30 and made of a magnetic material arranged in its surface opposed to said communication passage 10 with a plurality of coils 44, the adjacent ones of which have inverse directions of power supply;

a valve member 5a positioned in said communication and adapted to be brought into and out of contact with an annular valve seat 16;

an end block 14 fitted and fixed at the back of said stator 4 through a ring-shaped member 13;

an armature 5 positioned in a chamber 11 formed at the back of said stator 4, said armature 5 being formed with a shaft 50 which is fitted slidably in the thickness direction of said stator 4 and has its lower portion fixing said valve member 5a, said shaft 50 extending from the upper surface of said armature 5, said shaft 50 and said valve member 5a being extended therethrough by a passage hole 71;

a diaphragm 8 having its radially inner side welded to the upper portion of said shaft 50 and its radially outer side welded to said ring-shaped member 13; and a spring 6 having its one end supported by a spring receiving portion 9a, which is formed in said stator 4 concentrically with said shaft 50, and its other end pushing up said armature 5 to bring the upper end of said shaft into contact with the leading end of a stopper 18' which is fixed on said end block 14.

* * * * *